Aug. 7, 1945.  J. J. WAAGE  2,381,016
STACKER FOR SLICING MACHINES
Filed March 28, 1942    8 Sheets-Sheet 7

INVENTOR
JOHN JACOB WAAGE
BY
Ralph C. Leayton
ATTORNEY

Patented Aug. 7, 1945

2,381,016

UNITED STATES PATENT OFFICE 2,381,016

STACKER FOR SLICING MACHINES

John Jacob Waage, Stamford, Conn., assignor to Globe Slicing Machine Co. Inc., Stamford, Conn., a corporation of New York Application March 28, 1942, Serial No. 436,568

27 Claims. (Cl. 146—94)

This invention relates to stacking devices and more particularly to devices for stacking the cut slices of slicing machines.

One of the objects of the invention is to provide a more generally simplified and efficient stacker.

Another object of the invention is to locate the stacker control elements to improve the efficient operation of the machine without detracting from its appearance.

Other objects will become apparent as the description proceeds.

Comprehensively stated, the invention comprises means for stacking the slices cut by a slicing machine on a slice receiving member with mechanism for controlling its operation adjusted to the thickness of slices to be cut and affording a quick return of the member and control mechanism to slice receiving position.

More specifically stated, the invention includes a rotary knife and adjustable gauge plate, with a slice receiving plate mounted near one end of a pivoted arm with mechanism coordinated with the adjustment of the gauge plate for lowering the slice receiving plate concurrently with movement of the object holder including means for restoring the slice receiving plate to its initial position and with auxiliary means for straightening out the slice.

While one embodiment of this invention is illustrated in the accompanying drawings, it is to be understood that such embodiment merely serves as an illustration of the underlying principles of the invention so that they may be readily comprehended by those skilled in the art, and is not intended as limiting the invention to the specific details disclosed therein.

In said drawings:

Fig. 7 is a section of Fig. 6 on the line 7—7.

Fig. 7A is a section of Fig. 6 on the line 7A—7A.

Fig. 17 is an enlarged view of the quadrant mechanism for coordinating the descent of the slice receiving plate adjusted to the "set" of the gauge plate.

Continuing now by way of a more detailed description, a power driven rotatable cutting knife 10 has at one side an adjustable gauge plate 11 which may be raised and lowered with respect to the plane of the knife to control the thickness of the slices by any suitable mechanism as is well understood in the art. A reciprocating object holder 12 of the gravity feed type, although the invention is not limited to such type, is slidably mounted on parallel, preferably superimposed, guide shafts 13 and 14 and is adapted to be manually moved back and forth by the handle 15 relatively to the effective cutting edge of the knife. A slice receiving plate 16 for receiving the cut slices is adapted to be moved back and forth below the effective cutting edge of the knife simultaneously with the movement of the object holder 12. This plate 16 has a dependent lug which is pivotally mounted at 17, in the forked end of the reciprocating plate supporting arm 18, while the other bifurcated end of the arm 18 is pivoted at 19 to a vertically disposed reciprocable hanger post 20 formed with a sleeve 21 slidably mounted on guide shaft 13 and operatively connected to the floating sleeve 22 sliding on the guide shaft 14. The arm 18 is conveniently formed in two parts detachably locked together as will be explained hereinafter so that the end of the arm supporting the slice receiving plate may be dismounted from the hanger 20. The hanger 20 is also secured to or connected with the object holder 12 in any convenient manner so that the arm 18 and its slice receiving plate 16 may move back and forth relatively to the effective cutting edge of the knife simultaneously with the movement of the object holder.

The present stacker is shown as applied to an inclined object holder type of slicing machine and when so used the slice receiving plate is somewhat spaced below the effective cutting edge of the knife.

Figure 2:
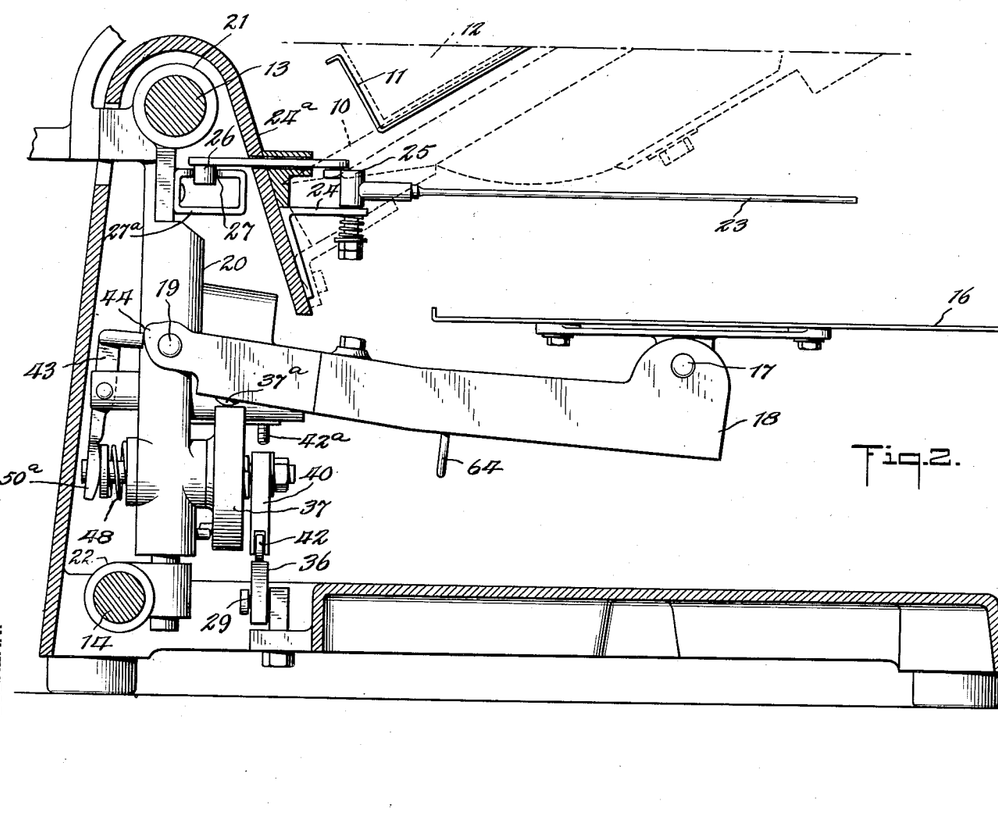
Fig. 2 is a side elevation partly in section viewing the device from the opposite side of that shown in Fig. 1.
Figure 3:
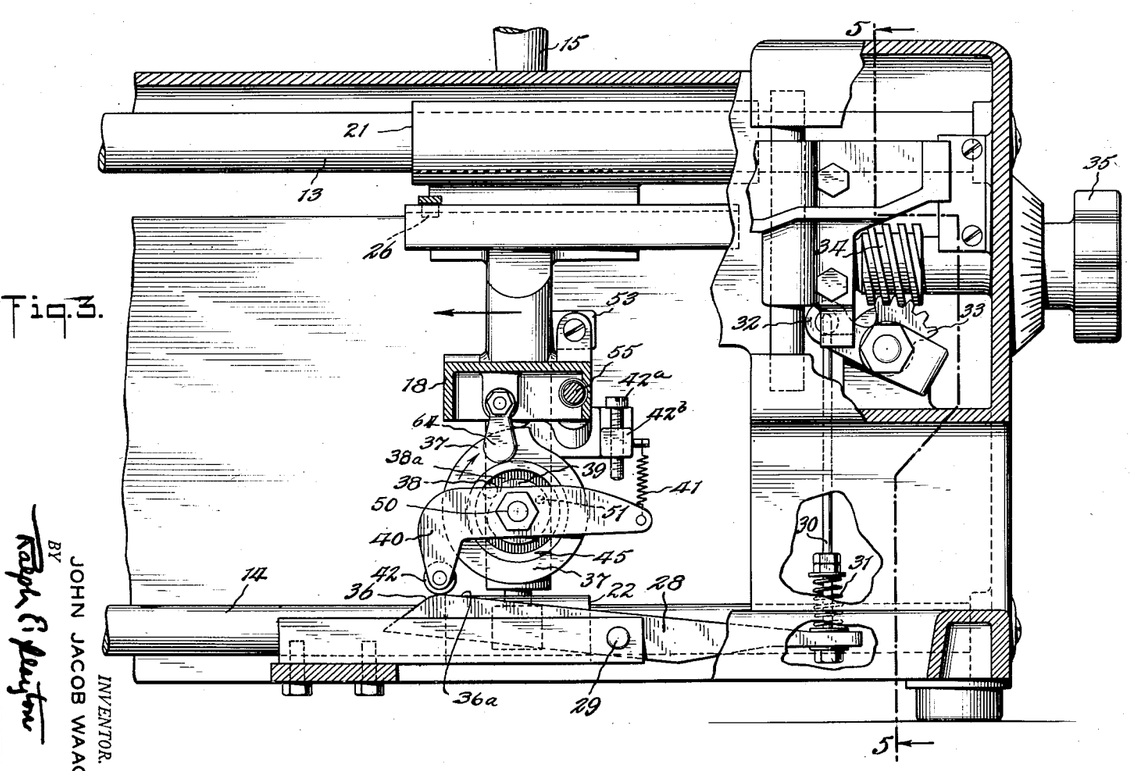
Fig. 3 is a section of Fig. 1 on the line 3—3.
Figure 4:
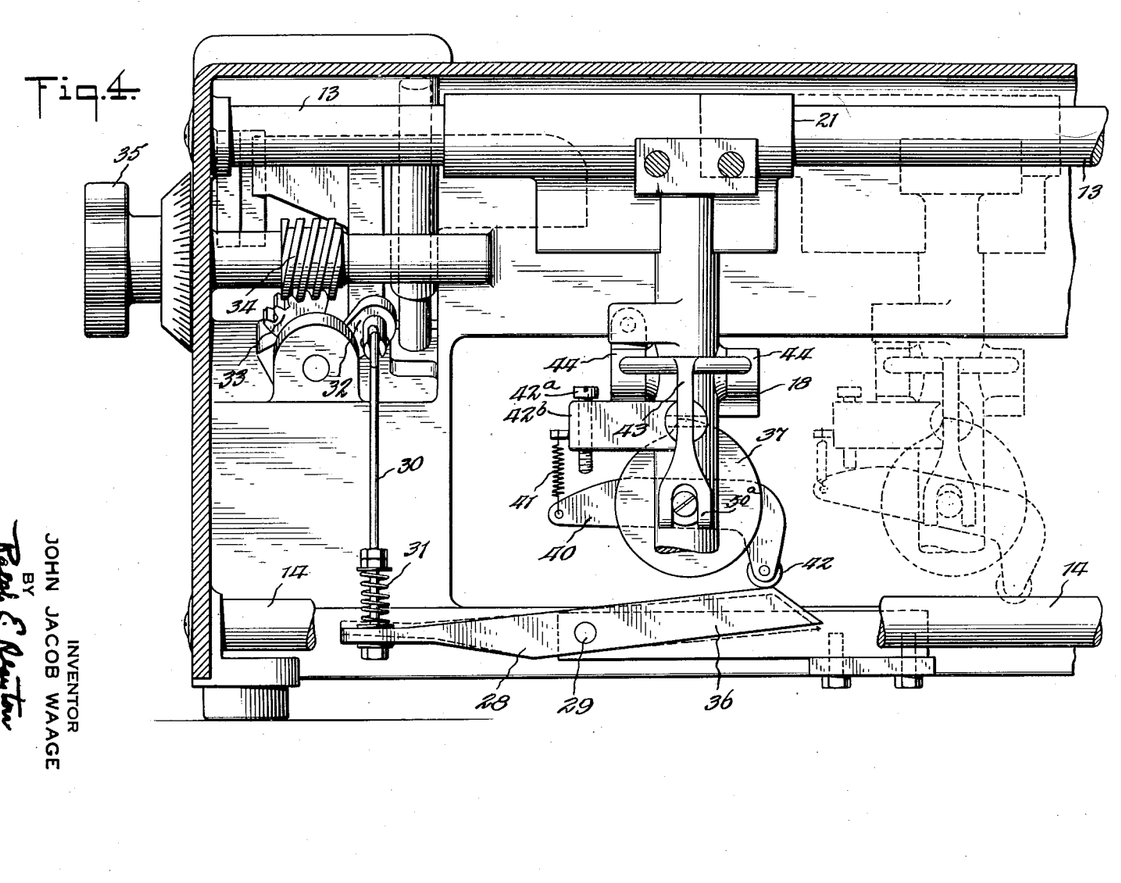
Fig. 4 is a view similar to that shown in Fig. 3, but viewed in a direction opposite to that shown in Fig. 3.
Figures 8, 9, 10, 11, 12, 13:
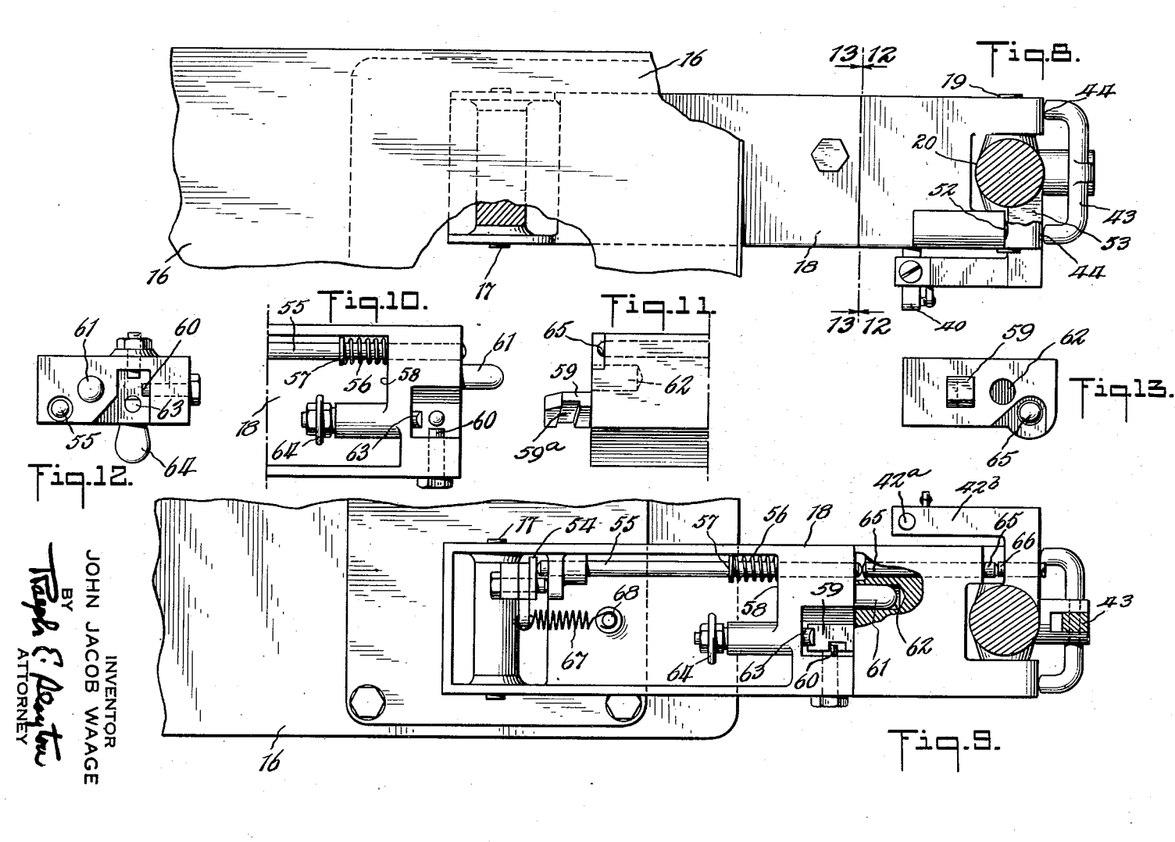
Fig. 8 is a fragmentary detailed view partly in section of a top plan view of the separable arm for mounting the slice receiving plate.
Fig. 9 is a view similar to that shown in Fig. 8 when viewed from the opposite side from that shown in Fig. 8.
Fig. 10 is an enlarged detailed view of the arm interlock shown in Fig. 9, before locking.
Fig. 11 is a perspective view of the member adapted to lock with the member shown in Fig. 9.
Fig. 12 is a section of Fig. 8 on the line 12—12.
Fig. 13 is a section of Fig. 8 on the line 13—13.
Figures 12, 16:
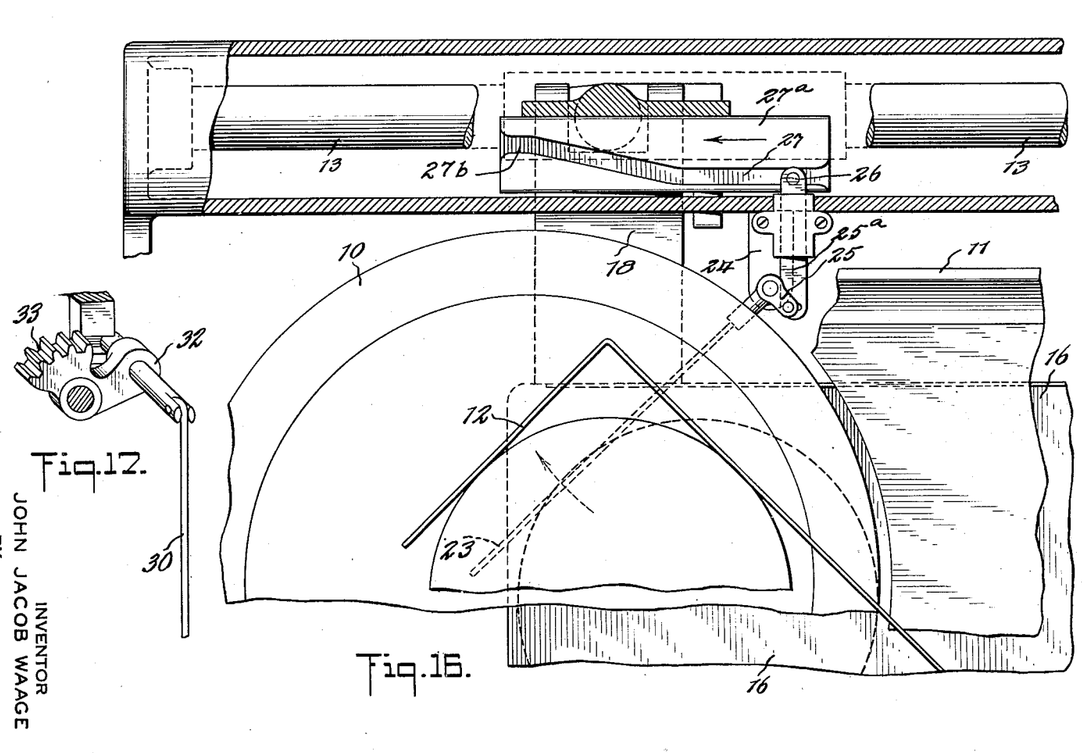
Fig. 16 is a section of Fig. 1 on the line 16—16.
Figure 15:
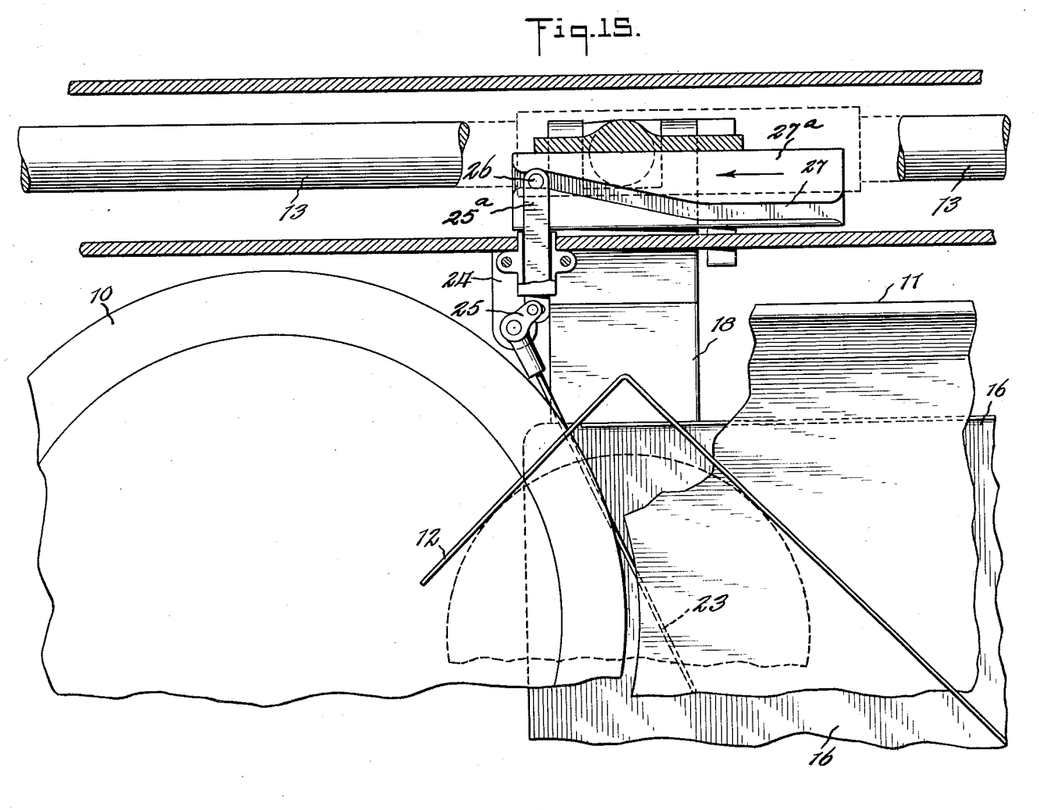
Fig. 15 is a section of Fig. 1 on the line 15—15.

To assist in straightening out the slices, when required, an auxiliary oscillating finger or arm 23 is arranged to oscillate in the region of the effective cutting edge to engage the end of the partly dependent cut slice and sweep it in the direction of the cutting stroke so that it will assume a flat position on the slice receiving plate 16. This finger 23 is pivotally mounted on a stationary bracket or boss 24, secured to the concealing apron 24a, and moved by a bell crank lever 25 and reciprocably slidable link 25a, one end of which has a cam roller 26 engaging a cam slot 27 in the sheet metal cam member 27a moving concurrently with the movement of the object holder and hanger 20 as will appear more fully hereinafter. The cam slot 27 is arranged, as appears more especially in Figs. 15 and 16, so that the operation of the finger is timed with the passage of the object holder across the effective cutting edge of the knife. The action of the finger is delayed by the cam groove portion 27b, see Fig. 16, until a portion of the cut slice depends from the knife edge, the finger striking rapidly due to the configuration of the cam slot. As the cut slices are stacked on the plate 16, it is contemplated lowering the plate to afford clearance for permitting the desired number of slices to accumulate thereon, and also in proportion with the thickness of the slices to be cut. To this end the control mechanism for lowering the slice receiving plate 16 and its pivoted supporting arm 18 is coordinated with the set of the gauge plate by a camming rocker arm 28 pivotally mounted at 29. One end of the arm 28 is connected to the gauge plate adjusting mechanism by a connecting link 30, one end of which is yieldingly connected to the rocker arm 28 by spring 31 and the other end secured to a bell crank 32 formed with or secured to a geared quadrant 33 engaging the threads 34 of the gauge plate 11 adjusting device adapted to be controlled by the manually operable member 35, see Fig. 4. As the rocker arm 28 is adjusted in accordance with the set of the gauge plate by rotation of the manually operable member 35, which simultaneously adjusts the gauge plate, the cam end 36 and cam surface 36a of the rocker arm 28 is raised or lowered proportionately to the adjustment of the gauge plate. The adjusted position of rocker arm 28 controls the descent of the slice receiving plate 16 and arm 18 as will appear hereinafter. The slice receiving plate supporting arm 18 bears on a rotatable cam 37 located at some point between the pivot point 17 of the slice receiving plate 16 and the pivot point 19 of the arm 18. As this cam 37 is rotated, the slice receiving plate 16 is lowered from its initial position because of the successively decreasing radii of the cam 37 engaging the bearing point 37a, Fig. 2, of arm 18 and the direction of movement of the cam as will be apparent more particularly from an inspection of Fig. 3. The intermittent rotation of this cam is effected by intermittently locking a ball bearing 38 against the periphery of the outside wall of the ball bearing race 38a formed in cam 37 by rotational movement of the irregularly shaped ball bearing locking member 39, Fig. 3, coaxially disposed with respect to the periphery of the ball bearing race 38a of the cam 37. The rotation of the irregularly shaped locking member 39 and lock of the ball bearing 38 to the race wall is effected by rotation of a trip 40 normally held by a spring 41 tending to move the trip in a counterclockwise direction when viewed as in Fig. 3 to press the depending trip wheel 42 downwardly. The rotational movement of the trip under the influence of the spring 41 is limited by an adjustable stop screw 42a mounted in a suitable bracket 42b. The release and locking of the ball bearing 38 between the member 39 and cam 37 is controlled by the camming rocker arm 28. When the trip wheel 42 is in its lowermost position, that is, when it is clear of the rocker arm 28, the ball bearing 38 is free and the member 39 is unlocked from the cam 37. When the object holder 12 approaches the end of its return stroke, the wheel 42 is lifted by striking the end of the rocker arm 28 which has been set in accordance with the slice adjustment of the gauge plate, the cam 37 is locked to the ball bearing locking member by the ball bearing 38 and is rotated against the frictional braking action of the weight of arm 18 in proportion to the tilt of the rocker arm 28. The rotation of cam 37 permits the slice receiving plate 16 to descend proportionately to the action of the trip.

The action for restoring the slice receiving plate to its initial position and holding the cam 37 in progressively advanced positions will become apparent hereinafter. When sufficient slices have been stacked on the slice receiving plate 16 and removed therefrom, it is desirable that the slice receiving plate 16 be restored to its initial position, and this is effected by manually lifting the free end of the arm 18 from the cam 37 to release the braking action of the arm 18 on the cam 37. This lifting has the effect of rotating rocker arm 43 through the intervention of the pair of cam noses 44 formed at the bifurcated end of arm 18 and rocking the rocker arm 43 in a clockwise direction when viewed as in Fig. 6. This disengages the cone-shaped clutch 45 from its cone shaped seat 46 to permit the cam 37 to rotate to its initial position relatively to its advancing mechanism under the influence of a coiled spring 48b which will now be described. The cam 37 is formed with a cylindrical sleeve 47 which is journalled in a bearing formed in the supporting hanger 20 and is secured against longitudinal movement in the bearing by ring 47a. The spring 48b is coiled around the sleeve 47 in a recess 48a formed in the hanger and has one end anchored to the cam 37 and the other end anchored to the hanger 20. This spring 48b rotates cam 37 when the arm 18 is lifted above its initial cam engaging position.

Figures 1, 14:
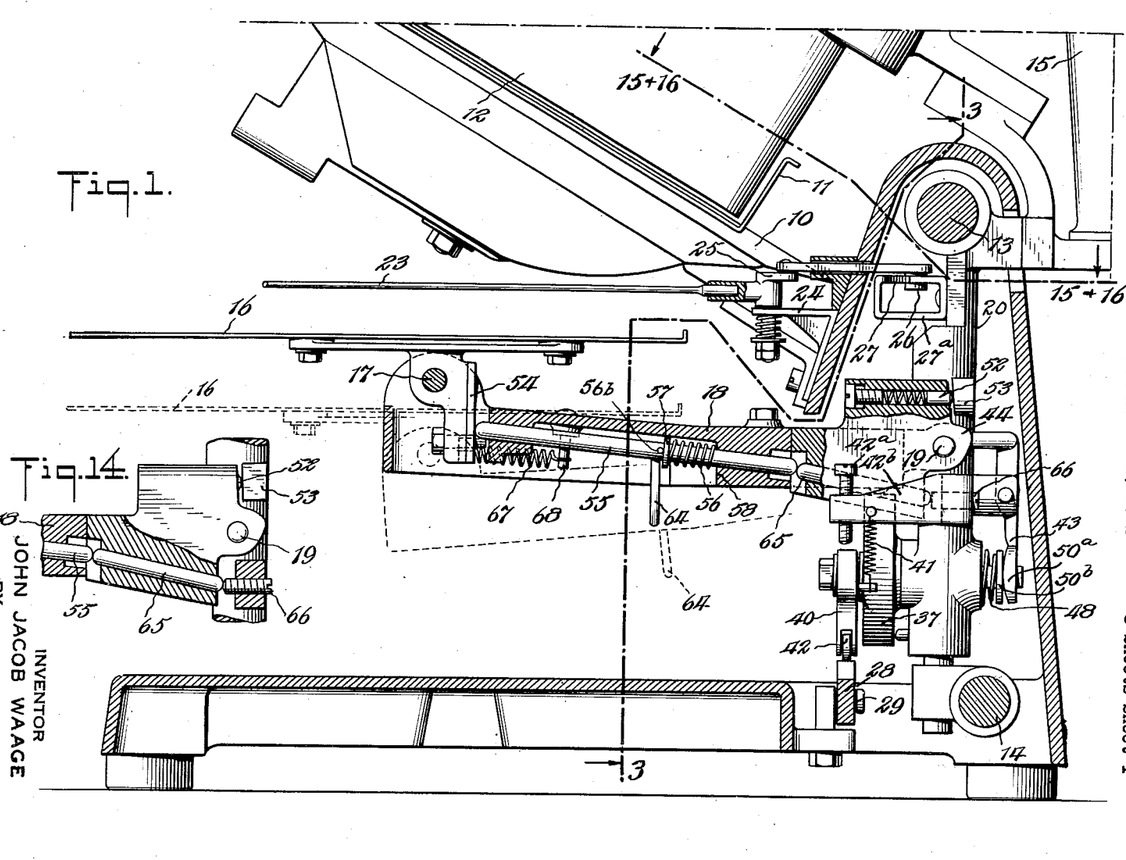
Fig. 1 is a side elevation partly fragmentary and partly in section.
Fig. 14 is an enlarged detailed view partly fragmentary and partly in section showing some of the elements shown in Fig. 1.
Figures 2, 2A, 5, 6:
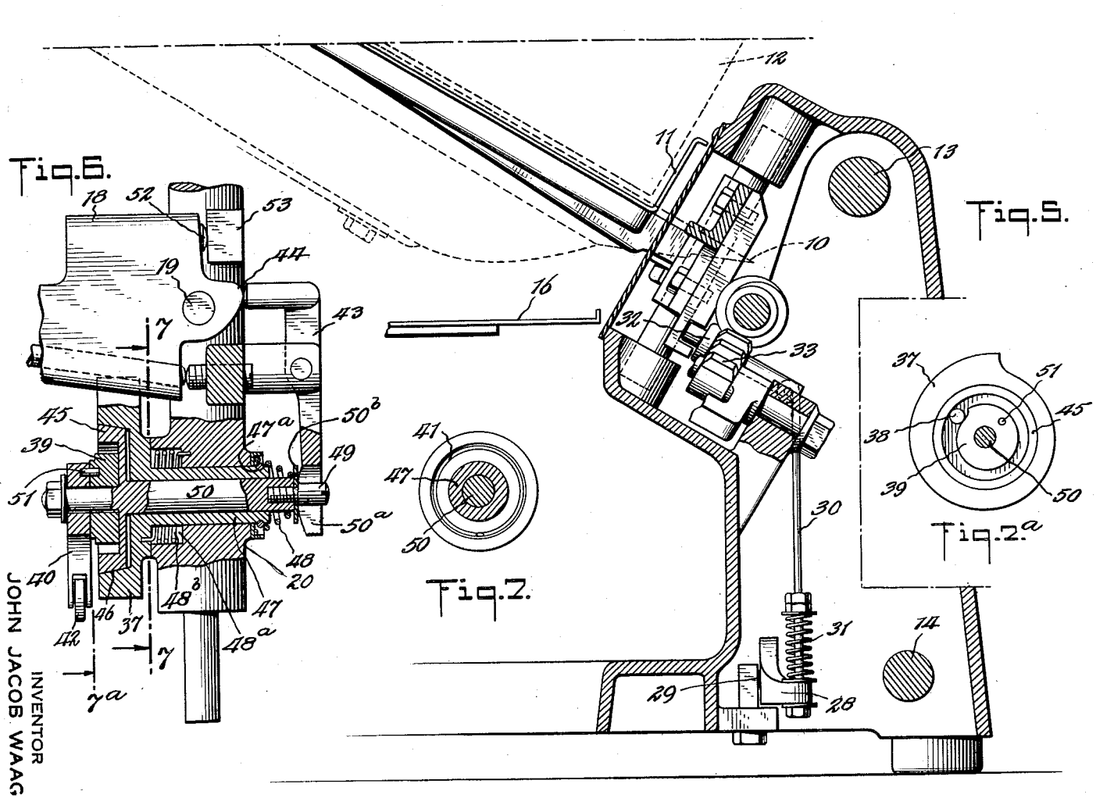
Fig. 5 is a section of Fig. 3 on the line 5—5.
Fig. 6 is an enlarged detailed view partly in section and partly fragmentary of some of the elements shown in Fig. 1.

In order to normally rotate the rocker arm 43 in a counterclockwise direction when viewed as in Fig. 6 and to hold clutch 45 locked, a spring 48 is interposed between the lower end of the rocker arm 43 and the cam sleeve 47. Since the cam sleeve 47 is prevented from moving longitudinally, its end forms an abutment. The adjustment of the pressure of this spring 48 is permissible by screw 49 secured to one end of the shaft 50 with which the cone clutch 45 is preferably formed. The screw 49 is located between the tines 50a and has an annular recess to receive washer 50b. The opposite end of shaft 50 has journaled thereon the trip 40 carrying the wheel 42 and is locked to the ball bearing locking member 39 by a pin 51. When the cam 37 is released by disengagement of the cone 45 through the intervention of the rocking arm 43 and the lifting of arm 18, the cam 37 is actuated to rotate to its initial position by the coil spring 48b without affecting the position of its associated control elements. The wheel 42, in riding over the cam faces of the rocker arm 28, while the clutch 45 is locked to cam 37 intermittently rotates the cam 37 so that it progressively assumes different positions and is frictionally held at such positions by the weight of plate supporting arm 18 against the inclination of cam 37. The rotation of cam 37 permits the slice receiving plate 16 to descend. The arm 18 on manual movement to its initial position is cushioned or resiliently stopped by an adjustable spring pressed plunger 52 located in a suitable recess in the enlarged end of arm 18 and is adapted to strike against an abutment or projecting lug 53 formed on hanger 20 as is more particularly shown in Fig. 1.

When the slice receiving plate 16 is moved above its initial raised slice receiving position, that shown in Fig. 2, that is, in a positon to release cam 37, the cams 44 at the forked end of the arm 18 actuate the rocker arm 43 to push the shaft 50, clutch 45 and its cam advancing members to the left when viewed as in Fig. 6, leaving the cam 37 free to assume its initial position by coil spring 48b. The pivoted arm 18 bears on the cam 37 and is prevented from descending thereby. When the gauge plate 11 is adjusted for the desired thickness of slice by means of the manually operable gauge regulating knob 35, the rocker arm 28 is proportionately tilted. On reciprocation of the object holder, hanger 20, slice receiving plate 16, and trip 40, the wheel 42 in riding over the top surface of rocker 28 tilts trip 40 around shaft 50 and locks member 39 to the clutch 45 through ball bearing 38 to advance cam 37 to lower arm 18. As the slice receiving plate 16 is lowered from its initial position, the cam noses 44 rise and enable the clutch 45 to lock the cam 37. The rotation of clutch 45 rotates cam 37 and permits the slice receiving plate to descend proportionately to the "set" of the gauge plate. The weight of the slice receiving plate 16 and arm 18 bearing on the top of the cam 37 prevents retrograde movement of cam 37 under the influence of coil spring 48b until the arm 18 is manually lifted to release the cam 37. Until the arm 18 is so lifted the cam 37 is progressively rotated in the direction of the arrow shown in Fig. 3 and the arm 18 and slice receiving plate 16 is permitted to descend progressively to receive successively the cut slices as the slice receiving plate is moved back and forth relatively to the knife edge.

In order to maintain the pivoted slice receiving plate 16 in horizontal position irrespective of the inclination of the plate supporting arm 18, a pantographic device is provided, the plate 16 having a dependent pusher face or flange 54 against which, one end of a rod 55 slidably mounted in the arm 18, presses. This arm 55 presses against the dependent pusher face 54 at a point below the plate pivot point 17 and limits or stops rotation of the plate 16 in a counterclockwise direction when viewed as in Fig. 1. The rod 55 is yieldingly held against the pusher face 54 by a spring 56 having one end bearing against an annular flange or washer 57 stopped on the rod by a pin 56b and the other end of the spring engaging the wall 58 of the arm 18. In order that the slice receiving plate 16 and part of arm 18 may be removed from the stacker, the latter comprises two interlocked parts with a hooked latch 59 having an angularly disposed hook face 59a locking with a keeper pin 60. The two parts of the arm 18 are normally held together by the interlock when the plate end of the arm 18 is rotated around the dowel pin 61 which fits the dowel pin recess 62 so that the hooked latch 59 engages the keeper pin 60. As the keeper pin 60 is swept past the angularly disposed hook face or cam 59a the parts of arm 18 are locked together. In order to prevent unlatching of the interlock a spring pressed auxiliary latch 63 is mounted at one end of one of the arm parts and engages the top of the hooked latch 59. A manually operable latch trigger 64 has one end secured to the latch and projects below the arm part so as to be readily accessible for disengaging latch 63 to permit rotation of the arm part around the dowel pin 61 to free the hooked latch 59 from its keeper pin 60.

When the parts of the arm 18 are locked together in operative position of the device, one end of the rod 55 engages one end of an auxiliary rod 65 which is longitudinally slidable in the part of arm 18 secured to hanger 20 the other end of which abuts against an adjusting screw 66. By adjusting screw 66 the auxiliary rod 65 may be moved longitudinally in the arm supporting bracket to vary the position of the rod 55 in the plate receiving end of the arm 18. As the plate receiving arm 18 and the slice receiving plate 16 are lowered by the action of the cam 37, the end of rod 55 abuts against flange 54 to maintain the slice receiving plate 16 in a horizontal position against the pull of a spring 67 which has one end attached to a dependent lug 68 secured to the arm 18 and the other end secured to the pusher face or flange 54 at a point below the pivot point 17 of the slice receiving plate 16. The end of the auxiliary rod 65 abuts the adjusting screw 66 in hanger 20 and in turn rod 65 abuts rod 55 which in turn forms an abutment for the flange 54 to maintain plate 16 level against the pull of spring 67 when the plate 16 is being lowered.

It is claimed:

1. The combination of a slicing machine including a frame having a rotary slice cutting knife having a fixed axis of rotation, and an object holder movable back and forth relatively to the knife, stacking means movable with said object holder, a rotating slice smoothing member rotating in a substantially horizontal plane for engaging the partly severed slice near its unsevered end, the member moving relatively to the slice toward the severed end of the slice prior to the completion of the cutting stroke, to flatten the slice for stacking.

2. The combination of a slicing machine having a rotary knife having a fixed axis of rotation and an object holder movable back and forth relatively to the knife, means including an oscillating slice smoothing member, oscillating in a horizontal plane, having a fixed axis of oscillation relative to said holder and located below the effective cutting edge of the knife for engaging the partly severed slice near its unsevered end, the member moving relatively to the slice in the direction of the severed end of the slice prior to the completion of the cutting stroke to flatten the slice for stacking.

3. The combination of a slicing machine having a rotary knife having a fixed axis of rotation, a reciprocating object holder movable back and forth relatively to the knife, with stacking means including an oscillating slice smoothing finger having a fixed axis of oscillation located below the effective cutting edge of the knife for engaging the partly severed slice near its unsevered end, the finger moving relatively to the slice in the direction of its severed end and mechanism connected to the object holder to oscillate the slice smoothing finger relatively to the knife on reciprocation of the object holder.

4. The combination of a slicing machine having a rotary slice cutting knife having a fixed axis of rotation, an object holder movable back and forth relatively to the knife with stacking means including a rotatable slice smoothing finger having a fixed axis for engaging and moving relatively to the partly severed slice prior to its severance to flatten the slice for stacking and means connecting and coordinating the movement of the smoothing finger with the movement of the object holder.

5. The combination of a slicing machine including a rotary slice cutting knife having a fixed axis of rotation, a reciprocating object holder movable back and forth relatively to the knife, with means including a movable slice smoothing member having a fixed axis of rotation for preliminary smoothing and means including a recipprocable slice receiving plate operatively connected to said object holder for moving such plate concurrently with the object holder, and means operatively connected to said object holder for moving the smoothing member at a different speed from the slice receiving plate.

6. The combination of a slicing machine having a rotary cutting knife, a reciprocating object holder movable back and forth with respect to the knife, an adjustable gauge plate for regulating the thickness of the slices, a hanger secured to the object holder and reciprocating concurrently therewith, a pantographic device having one end pivotally secured to the hanger and swinging in a vertical plane, a slice receiving plate pivotally mounted on the free end of the pantographic device, and mechanism connected to the pivoted end of the pantographic device and controlled by the adjustment of the gauge plate to lower the slice receiving plate in a horizontal position irrespective of the angular inclination of the pivoted pantographic device and proportionately to the adjustment of the gauge plate.

7. The combination of a slicing machine having a rotary cutting knife, an object holder movable back and forth with respect to the knife, means including a pivoted arm movable back and forth with respect to the knife concurrently with the movement of the object holder, a slice receiving plate pivotally mounted on the free end of the arm, means including a rotatable cam on which the arm rests for lowering the free end of the arm and the slice receiving plate, means for rotating the cam, as the object holder is moved back and forth and means for automatically restoring said cam to its initial position when the arm is manually lifted from the cam.

8. The combination of a slicing machine having a rotary cutting knife, an object holder movable back and forth with respect to the knife, a pivoted arm movable back and forth with respect to the knife concurrently with the movement of the object holder, a slice receiving plate pivotally mounted on the free end of the arm, a rotatable cam on which the pivoted arm rests, the rotation of the cam lowering the free end of the arm and the slice receiving plate as the object holder is moved back and forth and resilient means for automatically restoring said cam to its initial position when the arm is manually lifted from the cam.

9. The combination of a slicing machine having a rotary cutting knife, a movable object holder movable back and forth with respect to the knife, an adjustable gauge plate for regulating the thickness of the slices, a hanger connected to the movable object holder, a rotatable cam mounted on the hanger, an arm having one end pivoted to the hanger and resting on the cam, a rocking cam connected to the gauge plate and means actuated by the last named cam for rotating the rotatable cam on reciprocation of the object holder, the last named means including a clutch for intermittently and progressively rotating the said cam.

10. The combination of a slicing machine having a slicing knife, a reciprocating object holder movable back and forth with respect to the knife, an adjustable gauge plate for regulating the thickness of the slices, a hanger connected to the object holder, an arm comprising interlocking separable parts having one end pivoted to the hanger, a slice receiving plate mounted on the free end of the arm, means to detachably lock the arm parts together, and means operatively connecting said plate and arm parts to one another to guide the slice receiving plate in a horizontal position irrespective of the angular inclination of the pivoted arm and included separable parts.

11. The combination of a slicing machine having a rotary cutting knife, a reciprocating object holder movable back and forth with respect to the knife, a hanger connected to the object holder, an arm comprising interlocking separable parts having one part permanently pivoted to the hanger, the slice receiving plate mounted on the free end of the other part, means to detachably lock the two parts together, and means operatively connecting said plate and arm parts to one another to guide the slice receiving plate in a horizontal position irrespective of the angular inclination of the permanently pivoted arm part.

12. The combination of a base including a platform, an upright at the rear of said base, a rotary slicing knife mounted at the upper end of said upright and over-hanging said platform to provide a clearance from one end to the other of said platform below said knife, a hanger slidably mounted on said upright to move to and from said knife in a direction substantially parallel to said platform, a substance holder connected to said hanger and movable therewith, an arm comprising interlocking separable parts having one part pivotally connected to the hanger, a slice receiving plate mounted on the free end of the other part to reciprocate in the space between the platform and the over-hanging knife, means to detachably lock the two arm parts together, and means operatively connecting said plate and arm parts to one another to guide the slice receiving plate in a horizontal position irrespective of the angular inclination of the pivoted part when it is desired to receive the slices being cut on said slice receiving plate, said plate and arm parts being readily detachable to facilitate dispensing the slices without said slice receiving plate.

13. The frame of a slicing machine having a rotary cutting knife mounted at the upper end thereof with a free space below the level of the knife, a reciprocating object holder movable back and forth with respect to the knife, a hanger connected to the object holder, an arm comprising interlocking separable parts having one part connected to the hanger clear of the free space below the level of the knife, a slice receiving plate mounted on the free end of the other part, to reciprocate in said free space and means to detachably lock the two parts together when it is desired to receive the slices being cut on said plate, but otherwise readily detachable to facilitate dispensing the slices without said slice receiving plate.

14. The combination of a base including a platform, an upright at the rear of said base, a rotary slicing knife mounted at the upper end of said upright and over-hanging said platform to provide a clearance above said platform and below the level of said knife, a hanger slidably mounted on said upright to move to and from said knife in a direction substantially parallel to said platform, a substance holder connected to said hanger and movable therewith, an arm comprising interlocking separable parts having one part connected to the hanger and to one side of said clearance, a slice receiving plate mounted on the free end of the other part to reciprocate in the space between the platform and the level of the over-hanging knife, and means to detachably lock the two arm parts together, when it is desired to receive the slices being cut on said slice receiving plate, but readily detachable to facilitate dispensing the slices without said slice receiving plate.

15. The combination of a slicing machine having a rotary cutting knife, an object holder movable back and forth with respect to the knife, means including an arm movable back and forth with respect to the knife concurrently with the movement of the object holder, a slice receiving plate movably mounted on the free end of the arm, means including a rotatable cam on which the arm rests for lowering the free end of the arm and the slice receiving plate, and means including a yieldable clutch for rotating the cam various predetermined distances, as the object holder is moved back and forth.

16. The combination of a slicing machine having a rotary cutting knife, an object holder movable back and forth with respect to the knife, means including an arm movable back and forth with respect to the knife concurrently with the movement of the object holder, a slice receiving plate movably mounted on the free end of the arm, means including a rotatable cam on which the arm rests for lowering the free end of the arm and the slice receiving plate, and means including a friction clutch for rotating the cam various precise angular distances, as the object holder is moved back and forth.

17. The combination of a slicing machine having a rotary cutting knife, an object holder movable back and forth with respect to the knife, means including an arm movable back and forth with respect to the knife concurrently with the movement of the object holder, a slice receiving plate movably mounted on the free end of the arm, means including a rotatable cam on which the arm rests for lowering the free end of the arm and the slice receiving plate, means including a yieldable clutch for rotating the cam various predetermined distances, as the object holder is moved back and forth, and means for automatically restoring said cam to its initial position when the arm is manually lifted from the cam.

18. The combination of a slicing machine having a cutting knife, an object holder movable back and forth with respect to the knife, means including an arm movable concurrently with the movement of the object holder, a slice receiving plate movably mounted on the free end of the arm, a support operatively associated with said arm and movable to lower said arm and the slice receiving plate one step at a time corresponding to a predetermined slice thickness with each reciprocation of said object holder and arm, and means for automatically restoring said support to its initial position when the arm is manually lifted from said support.

19. The combination of a slicing machine having a cutting knife, an object holder movable back and forth with respect to the knife, means including an arm movable concurrently with the movement of the object holder, a slice receiving plate movably mounted on the free end of the arm, and an operative connection associated with said arm and movable to lower said arm and the slice receiving plate one step at a time corresponding to a predetermined slice thickness with each reciprocation of said object holder and arm, said operative connection including means enabling said arm to be restored to its initial raised position when the slice receiving plate and arm are manually lifted and said operative connection thereby released.

20. The combination of a slicing machine having a rotary slice cutting knife having a fixed axis of rotation, and an object holder movable back and forth relatively to the knife, stacking means movable with said object holder, an oscillating slice smoothing member, oscillating in a horizontal plane for engaging the partly severed slice near its unsevered end, and means operatively connecting said object holder and said member to move the member relatively to the slice toward the severed end of the slice prior to the completion of the cutting stroke to flatten the slice for stacking.

21. The combination of a slicing machine having a knife, an object holder movable back and forth with respect to the knife, an adjustable gauge plate for regulating the thickness of the slices, a hanger for movably supporting said object holder, a slice receiving plate, a movable pantographic device for connecting said slice receiving plate to said hanger for moving the slice receiving plate back and forth with respect to the knife in a rectilinear direction simultaneously with the movement of the object holder, and means connected to and controlled by the adjustment of the gauge plate to actuate said pantographic device to lower the slice receiving plate as the slices are stacked thereon, proportioned to the thickness of the cut slice and maintain the slice receiving plate substantially horizontal while descending.

22. The combination of a slicing machine having a slice cutting knife, an object holder, an adjustable gauge plate with means including a slice receiving plate to move the plate back and forth with respect to the knife in a rectilinear direction, a pantographic device pivoted to said object holder at a point remote from the cutting edge and supporting the slice receiving plate at its opposite end, means including a cam journalled on said object holder and supporting the pantographic device for lowering the slice receiving plate as the slices are stacked thereon, and means for rotating said cam as the object holder is moved back and forth in turn to lower said pantographic device, said pantographic device maintaining said slice receiving plate in substantially horizontal position while descending.

23. The combination of a slicing machine having a rotary knife, an object holder movable back and forth with respect to the knife, an adjustable gauge plate with means including a slice receiving plate movable back and forth with respect to the knife in a rectilinear direction, and a pantographic device pivoted to said object holder at a point remote from the effective cutting edge of the knife and supporting said plate at its free end and means for lowering the slice receiving plate as the slices are stacked thereon, including a rotatable cam journalled on said object holder and supporting the pantographic device, a pivoted cam, means connecting the pivoted cam to the gauge plate, and means to rotate the first named cam in cooperation with the last named cam, said pantographic device maintaining said slice receiving plate in substantially horizontal position while descending.

24. The combination of a slicing machine having a cutting knife, a hanger, an object holder mounted on said hanger, a pantographic device operatively connected to said hanger, a slice receiving plate on said pantographic device, said hanger and therewith said object holder and slice receiving plate being movable back and forth with respect to the knife, an ajustable gauge plate for regulating the thickness of the slices, and means in part connected to and controlled by the adjustment of the gauge plate and in part connected to said pantographic device for lowering the slice receiving plate as the slices are stacked thereon, proportioned to the thickness of the cut slice, said pantographic device maintaining the slice receiving plate substantially horizontal while descending.

25. The combination of a slicing machine having a cutting knife, an object holder movable back and forth with respect to the knife, means including an arm movable back and forth with respect to the knife concurrently with the movement of the object holder, a slice receiving plate movably mounted on the arm, means including a rotatable cam on which the arm rests for lowering the free end of the arm and the slice receiving plate, and means including a yieldable clutch for rotating the cam various predetermined distances, as the object holder is moved back and forth.

26. The combination of a slicing machine frame having a cutting knife mounted thereon, a hanger reciprocably mounted on said frame, an object holder mounted on said hanger, a pantographic device having separable parts, and a slice receiving plate removably connected to one part of said pantographic device, another of the parts of said pantographic device being movably connected to said hanger to lower said plate as slices are received thereon and maintain said plate substantially horizontal when in use, said first part being detachable from said second part when it is desired to dispense slices without said plate irrespective of the then level of the said plate.

27. The combination of a slicing machine frame having a cutting knife mounted thereon providing a clearance there below, a hanger reciprocably mounted on said frame to one side of said clearance, an object holder mounted on said hanger and movable above said clearance, a pantographic device having two parts, and a slice receiving plate removably connected to one part and movable in said clearance when in use, the other part being movably connected to said hanger to one side of said clearance, said parts being detachable to free said clearance when it is desired to dispense slices without said plate and said pantographic device maintaining said plate substantially horizontal when in use and movable in said clearance.

JOHN JACOB WAAGE.